(12) United States Patent
Jayaram et al.

(10) Patent No.: US 8,342,308 B2
(45) Date of Patent: Jan. 1, 2013

(54) CLUTCH UNIT

(75) Inventors: Mavinkal Jayaram, Broadview Heights, OH (US); Philip George, Wooster, OH (US); Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 782 days.

(21) Appl. No.: 12/384,474

(22) Filed: Apr. 4, 2009

(65) Prior Publication Data
US 2009/0260943 A1    Oct. 22, 2009

Related U.S. Application Data

(60) Provisional application No. 61/123,101, filed on Apr. 4, 2008.

(51) Int. Cl.
*F16D 13/42* (2006.01)
*F16D 13/00* (2006.01)

(52) U.S. Cl. .................. 192/70.23; 192/89.23
(58) Field of Classification Search .............. 192/89.21, 192/70.23, 89.23, 89.24
See application file for complete search history.

(56) References Cited

U.S. PATENT DOCUMENTS

| | | | |
|---|---|---|---|
| 5,669,480 A * | 9/1997 | Kooy et al. ................. | 192/89.21 |
| 6,176,361 B1 * | 1/2001 | Travers et al. ............ | 192/70.252 |
| 6,814,208 B2 * | 11/2004 | Drussel et al. ............ | 192/105 B |
| 7,681,705 B2 * | 3/2010 | Okada et al. ................. | 192/54.5 |
| 7,819,232 B2 * | 10/2010 | Ishida et al. .................... | 192/96 |
| 2008/0011575 A1 * | 1/2008 | Oishi .......................... | 192/93 A |

* cited by examiner

*Primary Examiner* — Ha D. Ho
*Assistant Examiner* — Jude Agendia
(74) *Attorney, Agent, or Firm* — Alfred J. Mangels

(57) ABSTRACT

A clutch unit with a clutch hub mounted non-rotatably on a shaft. The clutch unit includes at least two clutch elements that can be brought into frictional engagement with one another for torque transmission when the clutch unit is actuated by a mechanical actuation device with the help of cable-pull. The mechanical actuation device is attached to and held on the clutch unit.

30 Claims, 7 Drawing Sheets

CLUTCH UNIT

BACKGROUND OF THE INVENTION

1. Field of the Invention

The present invention relates to a clutch unit with a clutch hub mounted non-rotatably on a shaft, and has at least two clutch elements that can be brought into frictional engagement with one another for torque transmission, when the clutch unit is actuated by a mechanical actuation device with the help of cable-pull.

2. Description of the Related Art

From the German published application document DE 28 45 875 A1 a device for rotary-locked connection and separation of a driving force with a driven element is known, which is actuated with the help of a Bowden cable-pull. The release unit of the clutch unit includes a lever shoulder on which, on the one hand, the core of the Bowden cable-pull acts and on the other hand a spring. The release unit includes a sleeve with a steep-pitch thread in which balls are disposed. The counterpart to the steep-pitch thread is provided on a pot-shaped entity in form of bulges. The core of the Bowden cable-pull twists the sleeve relative to a rigidly connected component that is stationary with the engine. By being linked with the component connected firmly and in a stationary manner with the engine, oscillations and vibrations can be transmitted during operation, which can lead to undesired development of noise. Further clutch units in which undesired noise development can occur, are disclosed in these U.S. Pat. Nos. 1,549,976; 3,374,628; 4,310,083; 5,713,446 and 5,947,857.

An object of the present invention is to provide a clutch unit that is simple in design and that can be produced cheaply. Thus, in particular, undesired noise development during the operation of an internal combustion engine, which is equipped with the clutch unit, should be reduced substantially.

SUMMARY OF THE INVENTION

The object is achieved in that in a clutch unit with a clutch hub mounted non-rotatably on a shaft and provided with at least two clutch elements that can be brought in frictional engagement with one another for torque transmission when the clutch unit is actuated with the help of cable-pull exerted by a mechanical actuation device, the actuation device is fixed and held on the clutch unit. In accordance with an essential aspect of the invention, in terms of vibration theory, the actuation device is detached from the chassis and suspension of a vehicle equipped with the clutch unit, for example, of a motorcycle. Only the cable-pull acts on the actuation device, which, for instance, is actuated with the help of a hand-activated lever, for instance, which is attached in a pivotal manner to the handlebar of a motorcycle. The attachment and holder of the actuation device on the clutch unit have the advantage that neither oscillations nor vibrations are transmitted to the chassis via the actuation device. The actuation device is preferably purely mechanical in design and does not contain electronic components. Under the term "cable-pull," a cable, preferably, made of wire for the transmission of tensile forces is understood. The cable is preferably movably guided to-and-fro in a cable sheath and it is designated as a Bowden cable-pull. The clutch unit according to the invention, which can be designated as a membrane spring, is preferably biased by a diaphragm spring to its engaged position. The clutch elements are in the engaged position, for example discs of a multi-disc clutch, in frictional engagement. Through the actuation device, clutch elements in frictional engagement are separated from one another, thus disengaged. Therefore, the actuation device can be designated as a disengagement device.

A preferred exemplary embodiment of the clutch unit is characterized in that the actuation device is mounted on the shaft, together with the clutch unit. The shaft is, for instance, the drive shaft or crankshaft of an internal combustion engine. The actuation device is preferably not mounted on the shaft directly, but further elements are interposed.

A further preferred exemplary embodiment of the clutch unit is characterized in that the actuation device is supported axially on a clutch cover. The term axial refers to the axis of rotation of the shaft. Axial implies in the direction of or parallel to the axis of rotation of the shaft. According to an essential aspect of the invention, the actuation device is not supported on the chassis in the axial direction.

A further preferred exemplary embodiment of the clutch unit is characterized in that the actuation device is fixed axially between the clutch cover and a diaphragm spring. The actuation device is preferably not fixed directly between the clutch cover and the diaphragm spring, but under interposition of further elements. Preferably, axial bearing devices are disposed between rotating parts of the clutch unit in operation and parts of the actuation device so that no rotating motions are transmitted.

A further preferred exemplary embodiment of the clutch unit is characterized in that the actuation device includes a housing body with a housing collar that is supported axially on the clutch cover. Via the housing collar, the complete actuation device is held axially on the clutch cover.

A further preferred exemplary embodiment of the clutch unit is characterized in that an axial bearing device is disposed axially between the housing collar and the clutch cover. The axial bearing device allows low-friction relative torsion between the clutch cover and the housing body.

A further preferred exemplary embodiment of the clutch unit is characterized in that the housing body is mounted rotatably through a bearing bush on the clutch cover. The bearing bush is preferably a plain bearing bush. Through the bearing bush, the housing body is radially mounted on the clutch cover.

A further preferred exemplary embodiment of the clutch unit is characterized in that a cable-holding device is attached to the housing body. According to an essential aspect of the invention, the cable-holding device is attached to or mounted on the clutch unit, in particular on the clutch cover. It is not necessary to fasten the cable-holding device on stationary vehicle parts like the chassis.

A further preferred exemplary embodiment of the clutch unit is characterized in that the cable-holding device features a cable sheath socket. The cable sheath socket receives the end of a cable sheath, whose other end is preferably attached to a stationary part of the handlebar of a motorcycle. The cable sheath guides the cable-pull, of which one end, for instance, is fixed on a hand-activated lever, which is pivotally attached to the handlebar of the motorcycle.

A further preferred exemplary embodiment of the clutch unit is characterized in that the housing body features housing ramps that interact with actuation ramps, which are provided on an actuation body on which the cable-pull is attached. The actuation body is essentially formed as a ring and disposed rotatably inside the housing body. By means of the cable-pull, the actuation body can be rotated with the actuation ramps inside the housing body. The actuation ramps and the housing ramps are designed such that the actuation body moves away axially from the housing body or towards the housing body, when the actuation body is rotated relative to the housing body.

A further preferred exemplary embodiment of the clutch unit is characterized in that the cable-pull is hung in a cable-pull adapter that is linked with the actuation body. The cable-pull adapter extends out of the housing body and prevents the cable-pull from damage during operation. Furthermore, the cable-pull adapter simplifies the process of hanging-in the cable-pull.

A further preferred exemplary embodiment of the clutch unit is characterized in that balls are disposed between the actuation ramps of the actuation body and the housing ramps of the housing body. Through the balls, frictional losses during operation of the clutch unit are minimized.

A further preferred exemplary embodiment of the clutch unit is characterized in that the balls are held rotatably in a balls-holding body such that they lie on the actuation ramps of the actuation body and on the housing ramps of the housing body as well. The balls-holding body has the same function as the cage of a roller bearing. Thus, the balls represent the rolling bodies.

A further preferred exemplary embodiment of the clutch unit is characterized in that the housing body features an annular space for accommodating the actuation body. The annular space is enclosed for protection against environmental influences from outside. Preferably, the balls and the balls-holding body are also disposed inside the annular space.

A further preferred exemplary embodiment of the clutch unit is characterized in that the actuation body is mounted rotatably with the help of a bearing on the housing body. According to a further aspect of the invention, the bearing body also couples the actuation body axially with the diaphragm spring.

A further preferred exemplary embodiment of the clutch unit is characterized in that the bearing body includes a bearing race that is disposed in radial direction between the housing body and the actuation body. The bearing race can be executed as a plain bearing bush or can be equipped with a plain bearing bush.

A further preferred exemplary embodiment of the clutch unit is characterized in that the bearing body includes a bearing collar that interacts axially with an adapter-ring body. Via the bearing collar, axial movement of the bearing body is transmitted to the adapter-ring body.

A further preferred exemplary embodiment of the clutch unit is characterized in that an axial bearing device is disposed axially between an adapter-ring body shoulder and the bearing body collar. The axial bearing device prevents rotary motion of the adapter-ring body from being transmitted to the bearing body.

A further preferred exemplary embodiment of the clutch unit is characterized in that the adapter-ring body features an adapter collar on which diaphragm spring tongues of the diaphragm spring lie. According to a further aspect of the invention, an axial movement of the actuation body via the bearing body and the adapter-ring body is transmitted to the diaphragm spring tongues that extend from a diaphragm spring ring-body radially inwards.

A further preferred exemplary embodiment of the clutch unit is characterized in that the actuation device includes a housing body with an axial guide section on which an actuation body is guided movably to-and-fro axially. According to a further aspect of the invention, the diaphragm spring is actuated through an axial movement of the actuation body.

A further preferred exemplary embodiment of the clutch unit is characterized in that on the housing body a cable-pull device with a socket for cable sheath is attached, through which cable-pull extends. The cable-pull device is preferably attached so firmly to the housing body such that the cable sheath is held inside the cable sheath socket, while the corresponding cable-pull extends through the cable sheath and the cable sheath socket.

A further preferred exemplary embodiment of the clutch unit is characterized in that the housing body features a circumferential guide section on which a cable-pull socket for the cable-pull is disposed rotatably. According to a further aspect of the invention, rotary motion of the cable-pull socket is used to generate an axial movement of the actuation body.

A further preferred exemplary embodiment of the clutch unit is characterized in that the cable-pull socket features a cable-pull socket. Preferably, the cable-pull is hung-in inside the cable-pull socket, in the circumferential direction.

A further preferred exemplary embodiment of the clutch unit is characterized in that the cable-pull socket features a cable-pull coiling section on which a part of the control cable can be coiled. When the control cable is subjected to tension, then the control cable will be pulled a bit inside the cable sheath, whereby a section from the control cable of the control cable coiled section is coiled. Twisting of the cable-pull socket thus caused is utilized to generate the axial movement of the actuation body.

A further preferred exemplary embodiment of the clutch unit is characterized in that the control-cable coiled section features a cable-pull receptacle groove for the cable-pull. Thus, undesired lateral slip of the cable-pull on the cable-pull coiling element is prevented during operation.

A further preferred exemplary embodiment of the clutch unit is characterized in that the cable-pull socket features a collar supported axially on the clutch cover. Through the collar of the cable-pull socket, the complete actuation device is held on the clutch cover and thus on the clutch unit according to a further aspect of the invention.

A further preferred exemplary embodiment of the clutch unit is characterized in that an axial bearing device is disposed axially between the collar and clutch cover. The axial bearing device enables low-friction relative torsion between the clutch cover and the cable-pull socket.

A further preferred exemplary embodiment of the clutch unit is characterized in that a bearing bush is disposed between the cable-pull socket and clutch cover, in radial direction. Through this, the cable-pull socket is mounted rotatably on the clutch cover, in radial direction.

A further preferred exemplary embodiment of the clutch unit is characterized in that the collar features ramps that interact with actuation ramps, which are provided on the actuation body. The actuation body is essentially annular in shape. The ramps and actuation ramps are designed such that the actuation body moves away axially from the cable-pull socket, when it is set in rotation by actuation of the cable-pull.

A further preferred exemplary embodiment of the clutch unit is characterized in that balls are disposed between the actuation ramps of the actuation body and the ramps of the cable-pull socket. The balls represent rolling bodies and minimize frictional losses during interaction of the ramps.

A further preferred exemplary embodiment of the clutch unit is characterized in that the balls are held rotatably in a balls-holding body such that they lie on the actuation ramps of the actuation body and on the ramps of the cable-pull socket as well. The balls-holding body has the same function as a cage of a roller bearing.

A further preferred exemplary embodiment of the clutch unit is characterized in that the actuation body features an actuation collar on which the actuation ramps are provided.

The actuation collar according to a further aspect of the invention is indirectly coupled axially with the diaphragm spring on the side facing away from the actuation ramps.

A further preferred exemplary embodiment of the clutch unit is characterized in that the actuation body features an axial guide section, with which the actuation body is guided axially and movably to-and-fro on the housing body. The axial guide section of the actuation body is preferably executed complementarily to the axial guide section of the housing body.

A further preferred exemplary embodiment of the clutch unit is characterized in that the actuation collar of the actuation body interacts with the diaphragm spring. The diaphragm spring can lie directly on the actuation body. According to a further aspect of the invention, further elements are connected axially between the actuation body collar and die diaphragm spring.

A further preferred exemplary embodiment of the clutch unit is characterized in that an adapter-ring body is disposed axially between the diaphragm spring and the actuation collar of the actuation body. The adapter-ring body transmits the movement of the actuation body axially to the diaphragm spring.

A further preferred exemplary embodiment of the clutch unit is characterized in that an axial bearing device is disposed axially, between the actuation collar of the actuation body and a shoulder of the adapter-ring body. The axial bearing device enables twisting of the adapter-ring body relative to the actuation body.

A further preferred exemplary embodiment of the clutch unit is characterized in that an axial spring device is disposed axially between the shoulder of the adapter-ring body and the axial bearing device. The axial spring device holds the adapter-ring body in contact with the diaphragm spring.

A further preferred exemplary embodiment of the clutch unit is characterized in that the adapter-ring body features an adapter-ring collar on which tongues of the diaphragm spring lie. The diaphragm spring tongues extend radially inward from a ring body of the diaphragm spring.

A further preferred exemplary embodiment of the clutch unit is characterized in that the diaphragm spring is installed under initial stress such that the clutch elements are held in frictional engagement, so long as the actuation device is not actuated with the help of the cable-pull. The clutch elements, for example, are frictional discs of a multi-disc clutch. When the actuation device is actuated with the help of the cable-pull, then the clutch elements are disengaged from their frictional engagement.

A further preferred exemplary embodiment of the clutch unit is characterized in that the actuation device can be actuated via the cable-pull by means of a hand-activated lever. The hand-activated lever, for example, is pivotally attached to a handlebar of a motorcycle. The cable-pull is actuated via the hand-activated lever as is common with motorcycles.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

In FIGS. 1 to 5, a clutch unit 1 is shown in different views. The clutch unit 1 includes an actuation device 2, through whose actuation clutch elements 4, which are in frictional engagement, can be released from one another. The clutch elements 4 are for instance discs, in particular inner discs and outer discs, which are disposed in a set of discs.

The actuation device 2 is actuated via a cable-pull device (not shown), which includes a cable-pull guided through a cable sheath. An end of the cable-pull is attached to a hand-activated lever, for example, which is pivotally attached to a motorcycle handlebar. An end of the cable sheath, for example, is attached to a stationary part of the motorcycle handlebar.

Figure 1:
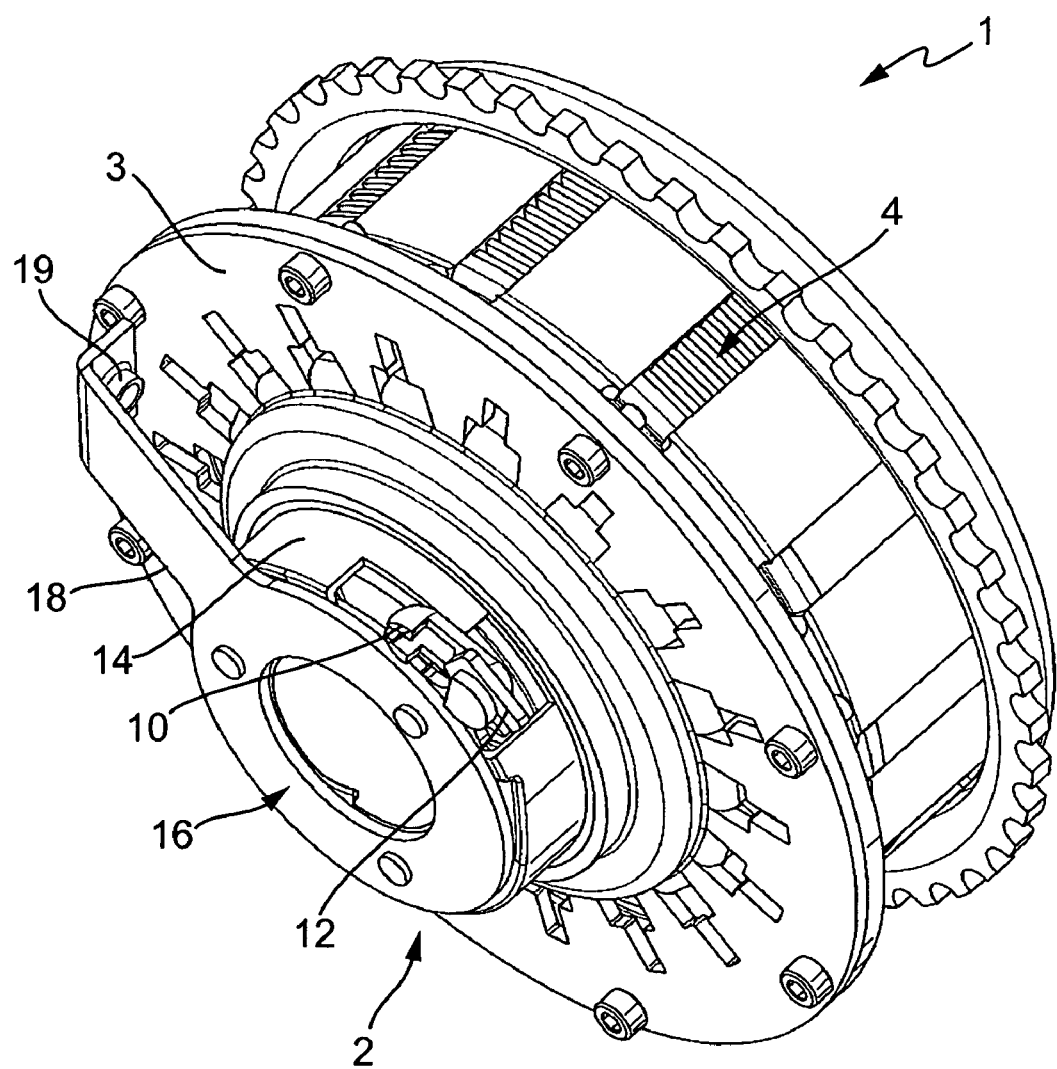
FIG. 1 is a perspective view of a clutch unit according to a first exemplary embodiment of the invention with view of the actuation device.
Figure 2:
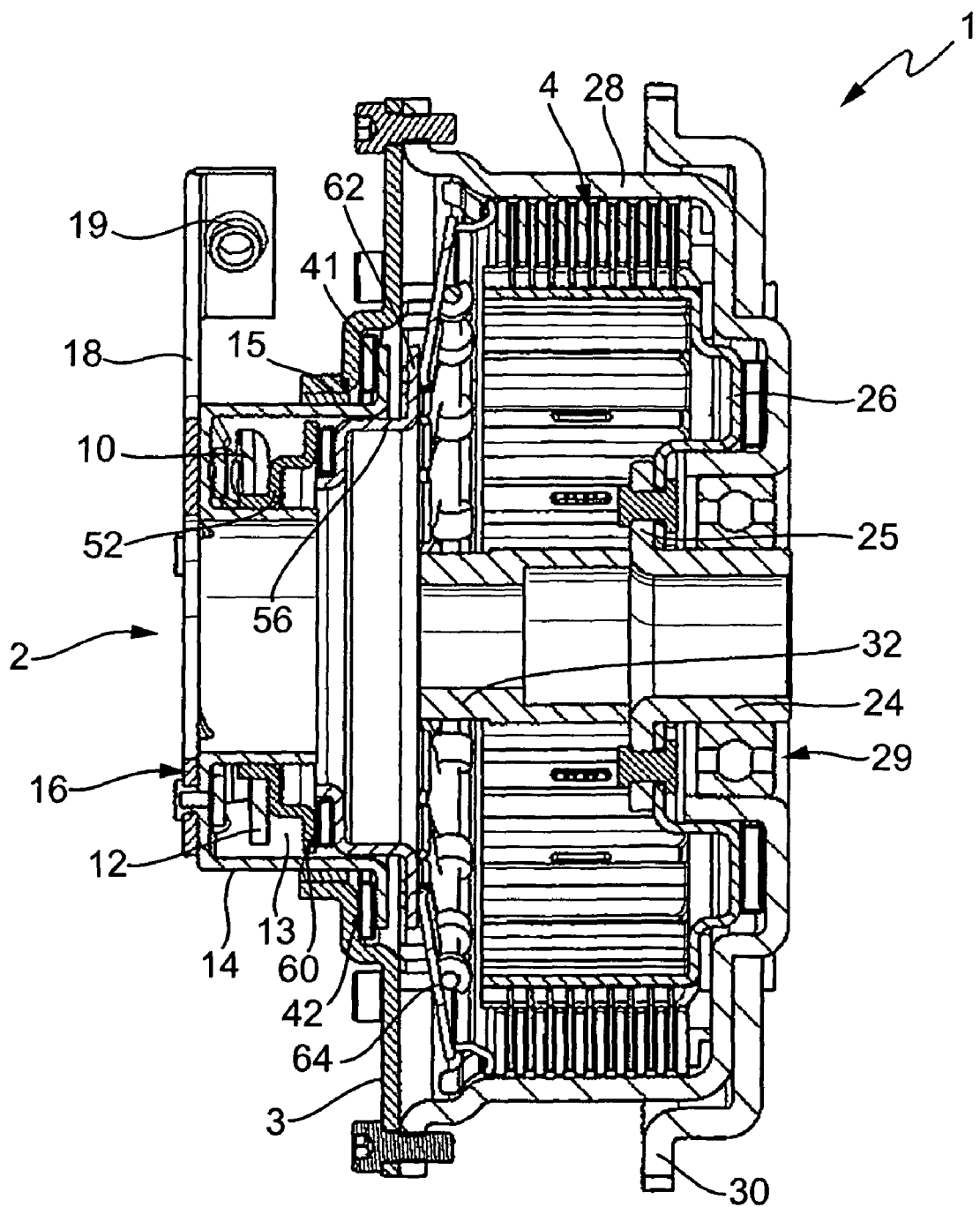
FIG. 2 is a longitudinal cross-sectional view of the clutch unit of FIG. 1.

The other end of the cable-pull is hung in a cable-pull adapter 10, which is hinged to an actuation body 12. The actuation body 12, as one sees in FIG. 2, is disposed in an annular space 13, which is provided in a housing body 14. The housing body 14 is with the help of a bearing bush 15 mounted rotatably on or in the clutch cover 3. The bearing bush 15 is for example a plain bearing bush.

A cable-holding device 16 is fixed on the housing body 14 that features a cable-pull retaining-arm 18. The cable-pull retaining-arm 18 features a cable sheath socket 19 on its free end, for the cable sheath of the cable-pull device. The cable-pull extends through the cable sheath socket 19 out of the cable sheath to the cable-pull adapter 10.

Figure 3:
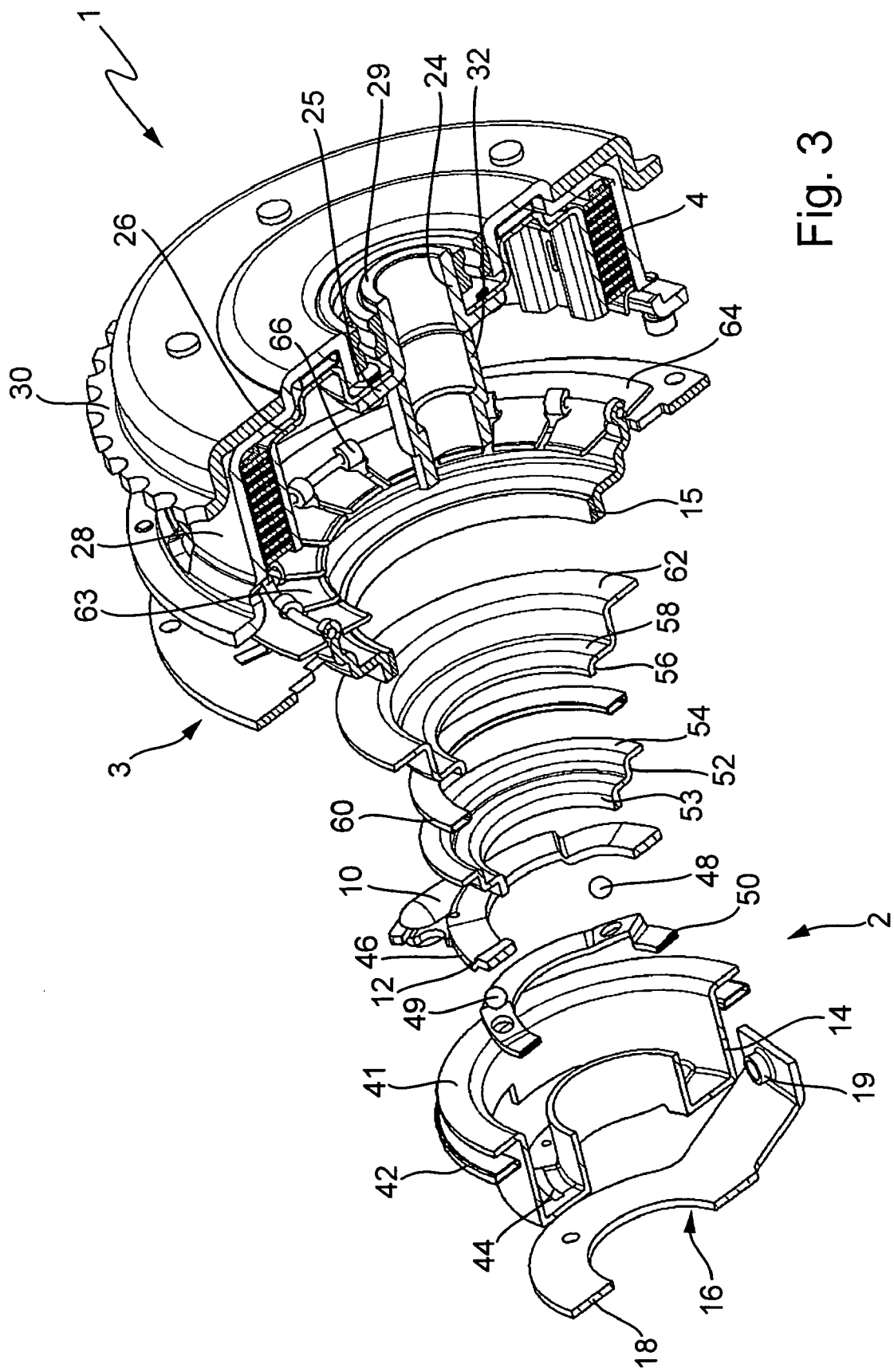
FIG. 3 is an exploded view of the clutch unit of FIGS. 1 and 2.

The clutch unit 1 includes, as one sees in FIGS. 2 and 3, a clutch hub 24 that is connected non-rotatably with a shaft (not shown), in particular a drive shaft of an internal combustion engine. From the clutch hub 24, a clutch hub flange 25 extends radially outwards, which is connected as a single piece with the clutch hub 24. On the clutch hub flange 25, an inner disc carrier 26 is fixed, and is connected non-rotatably with inner discs that interact with external discs connected non-rotatably with an external disc carrier 28.

The external disc carrier 28 is mounted on the clutch hub 24 rotatably with the help of a bearing device 29. A ring gear 30 is fixed on the external disc carrier 28, which, for example, is connected non-rotatably with the drive chain of a motorcycle. When the clutch elements 4, thus the inner discs and the external discs of the illustrated disc sets are in frictional engagement with one another, then torque from the drive shaft will be transmitted via the clutch unit 1 to the ring gear 30. When the clutch elements 4, thus the external discs and the inner discs, detach from one another, then, owing to the missing frictional lock, the torque transmission between the drive shaft and the ring gear 30 will be interrupted.

The clutch hub 24 and the complete clutch unit 1 are fixed on the shaft with the help of a screw element 32. The shaft features steps for this purpose, which fit together with analogous steps of the screw element 32. Furthermore, the shaft features an external thread on its free end, which interacts with a complementary internal thread of the screw element 32. The external diameter of the screw element 32 corresponds approximately to the external diameter of the clutch hub 24. The clutch hub flange 25 faces the screw element 32.

In FIGS. 2 and 3 one sees that the housing body 14 features a housing collar 41 that lies on the inner side of the clutch cover 3, under an interposed axial bearing device 42. Inside the annular space 13, the housing body 14 features housing ramps 44 interacting with actuation ramps 46 formed on the actuation body 12.

Between the housing ramps 44 and the actuation ramps 46, the balls 48, 49 are disposed, which are held in position with the help of a balls-holding body 50. The balls 48, 49 reduce friction due to the interaction between the ramps 44, 46. The ramps 44, 46 are designed such that the actuation body 12 moves away axially from the housing ramps 44 of the housing body 14, when the actuation body 12 Is rotated relative to the housing body 14 via the cable-pull in the annular space 13.

The actuation body 12 is mounted rotatably inside the housing body 14 by a bearing race 53 of a bearing body 52. The bearing body 52 features a bearing collar 54 interacting axially with an adapter-ring body 56. The adapter-ring body 56 includes a shoulder 58 lying on an axial bearing device 60 that is disposed axially between the adapter-ring body 56 and the bearing collar 54 of the bearing body 52. The adapter-ring body 56 furthermore includes an adapter collar 62 that lies on diaphragm spring tongues 63 of a diaphragm spring 64.

The diaphragm spring 64 is supported under initial stress on the support elements 66 of the clutch cover 3, such that the clutch elements 4 are held by the initially stressed diaphragm spring 64 in frictional engagement, so long as the actuation device 2 is not actuated via the cable-pull. When the actuation device 2 is actuated via the cable-pull then the cable-pull adapter 10 moves toward the cable sheath socket 19. In that manner, the actuation body 12 is rotated inside the annular space 13 of the housing body 14 in which, through the interaction of the actuation ramps 46 with the housing ramps 44, an axial movement of the actuation body 12 is generated. The axial movement of the actuation body 12 causes axial displacement of the bearing body 52, which is transmitted to the diaphragm spring 64, via the adapter-ring body 56.

In normal operation of the clutch unit 1, small amount of torque resulting from friction on the axial bearing devices 42, 60 and on the bearing bush 15 can be transmitted to the actuation device 2. Normally, the stiffness of the cable-pull absorbs this small amount of torque. Additionally, it is possible to fix the cable-pull retaining-arm 18 on a chassis of the motorcycle such that twisting of the cable-pull holding-arm 18 is prevented. The fixture, however, has to be dimensioned such that no undesired vibrations or oscillations are transmitted from the actuation device 2 to the chassis. An axial support of the cable-pull holding-arm 18 is not provided on the chassis.

Figure 4:
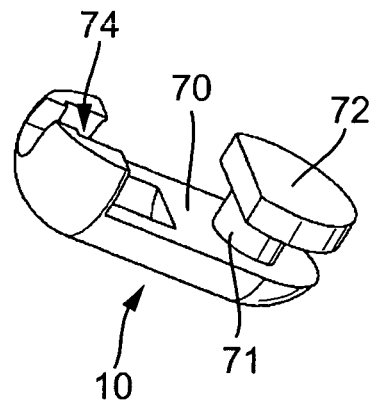
FIG. 4 is a perspective view of a cable-pull adapter of the clutch unit of FIGS. 1 to 3.
Figure 5:
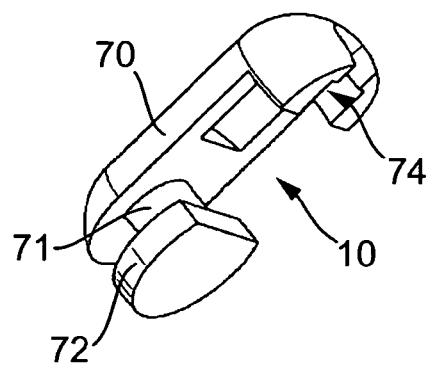
FIG. 5 is another perspective view of the cable-pull adapter of FIG. 4.

In FIGS. 4 and 5, the cable-pull adapter 10 is shown alone in perspective in different views. The cable-pull adapter 10 includes a base body 70 with a bearing pin 71, which is limited by an end body 72. The bearing pin 71 attaches the cable-pull adapter 10 pivotally on the actuation body 12. The cable-pull adapter 10 moreover includes a cable-pull receptacle 74, in which an end of the cable-pull is received.

In FIGS. 6 to 10, a clutch unit 81 is shown in perspective, in different views. The clutch unit 81 is actuated with the help of a cable-pull (not shown) via an actuation device 82, which is attached to the clutch unit 81. Clutch elements 84 of the clutch unit 81 are disengaged via the actuation device 82 from frictional engagement, so that they can rotate relative to one another.

The actuation device 82 includes a cable-pull socket 90 that essentially features the shape of a cylindrical jacket with a cable-pull coiling section 93. The cable-pull socket 90 shown alone in a perspective view in FIG. 10 includes a slotted receiving section 91 for one end of the cable-pull. The receiving section 91 transforms into a passage hole 92 that represents a cable-pull receptacle through which the end of the cable-pull can be fitted before the receiving section 91. A cable-pull receptacle groove 94 originates from the receiving section 91 that prevents lateral slip of the partly coiled cable-pull.

Figure 6:
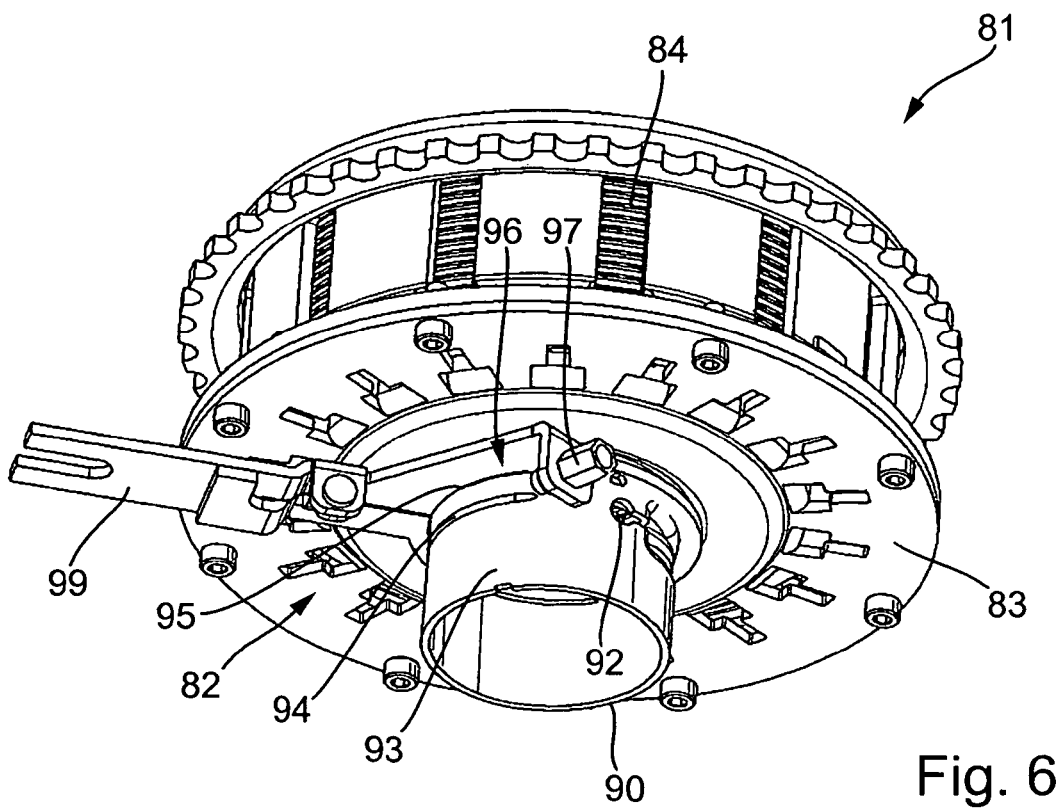
FIG. 6 is a perspective view of a clutch unit according to a second exemplary embodiment of the invention showing an actuation device.

The cable-pull socket 90 furthermore includes a slit 95 that enables sticking in or engagement of a cable-holding device 96 that, as seen in FIG. 6, is partly disposed inside the slit 95. The cable-holding device 96 includes a cable sheath socket 97 for said sheath. The cable-pull extends from the cable sheath through the cable sheath socket 97 to the cable-pull receptacle groove 94. Inside the cable-pull receptacle groove 94, the cable-pull is coiled around the cable-pull socket 90.

The cable-holding device 96 furthermore includes an anti-rotation arm 99 that can be fixed on a motorcycle chassis in order to prevent undesired rotation of the cable-holding device 96. The anti-rotation arm 99 does not serve for fixing, in particular an axial support, the actuation device 82 on the chassis.

Figure 7:
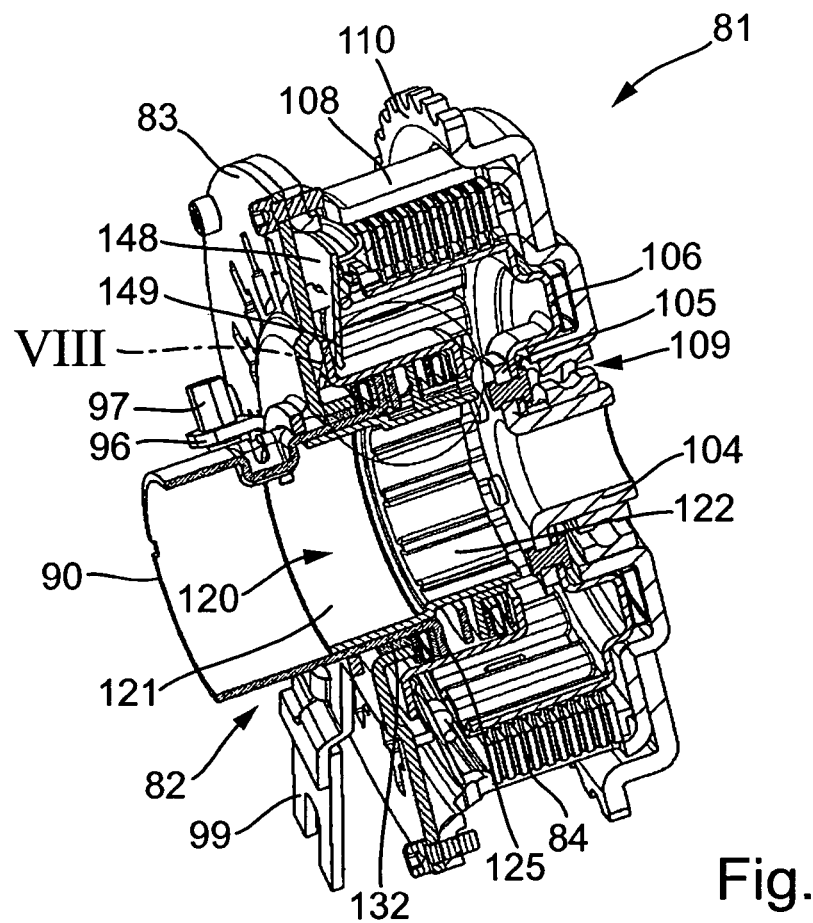
FIG. 7 is a perspective view of the clutch unit of FIG. 6 in cross-section.
Figure 8:
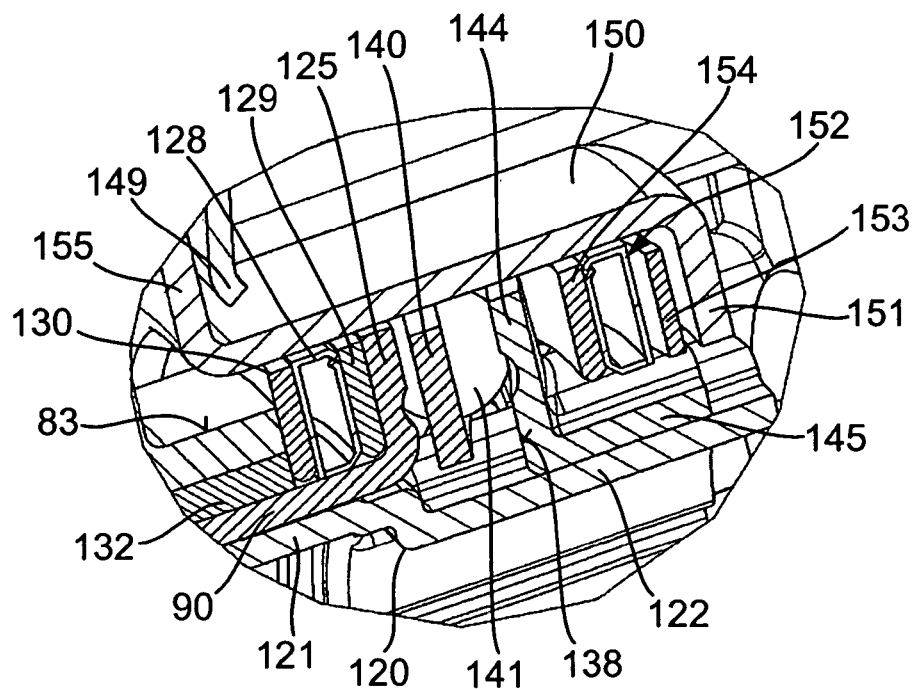
FIG. 8 is an enlarged view of region VIII of FIG. 7.
Figure 9:
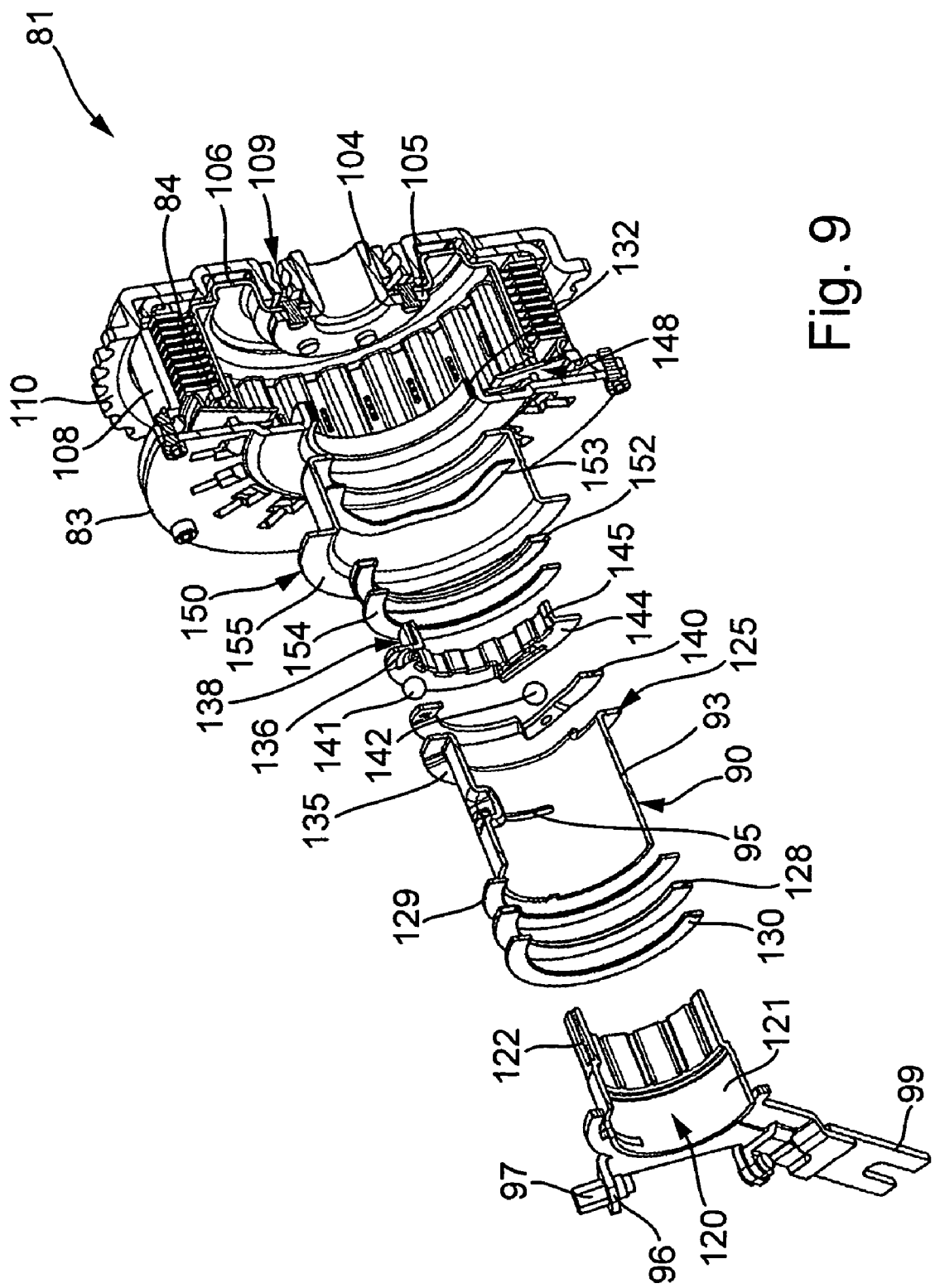
FIG. 9 is an exploded view of the clutch unit of FIGS. 6 to 8.
Figure 10:
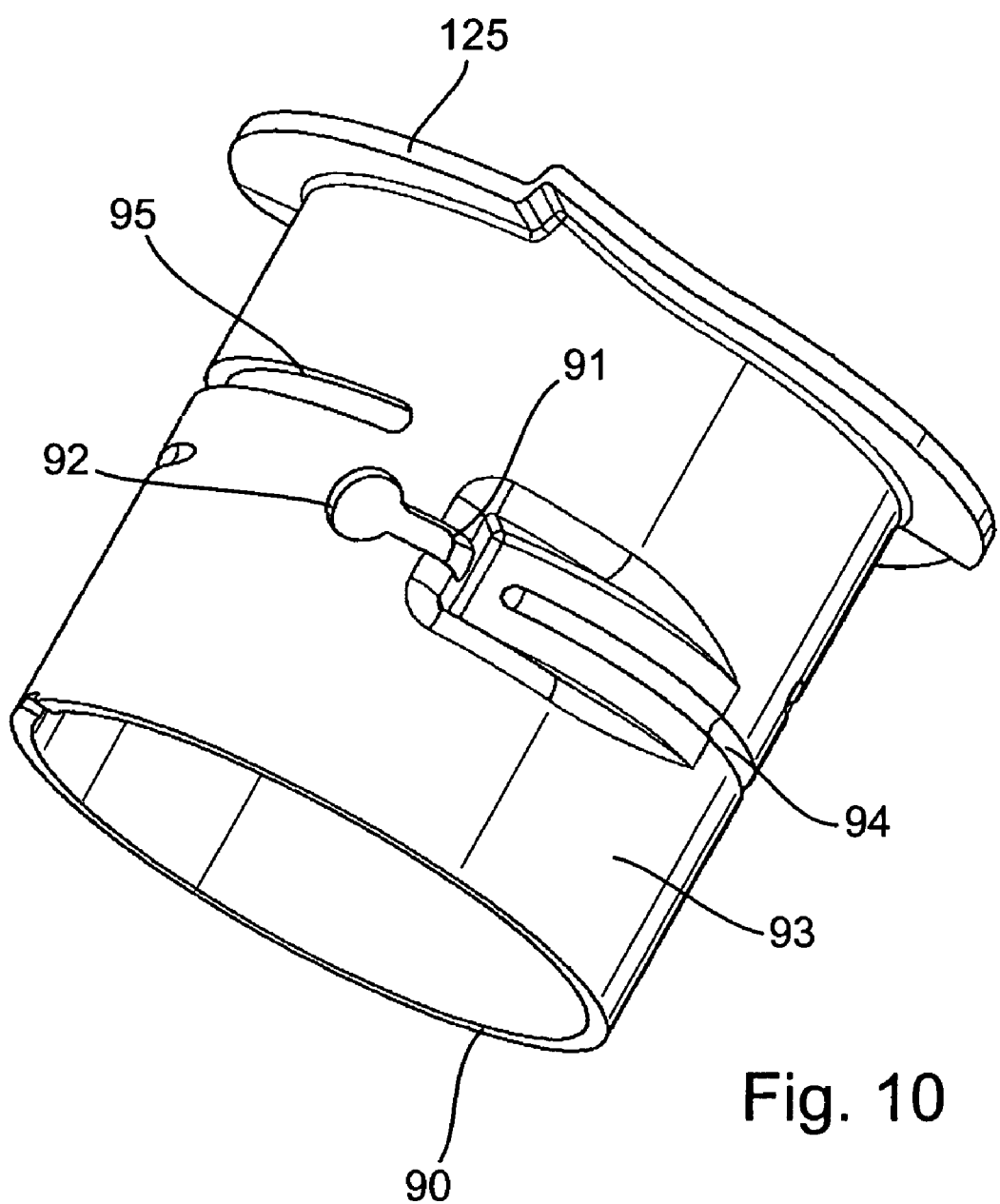
FIG. 10 is a perspective view of a cable-pull socket of the clutch unit of FIGS. 6 to 9.

In FIGS. 7 to 9, one sees that the clutth unit 81 includes a clutch hub 104 with a clutch hub flange 105, on which an inner disc carrier 106 is fixed. The inner disc carrier 106 is non-rotatably connected with inner discs that interact with external discs connected non-rotatably with an external disc carrier 108. The external disc carrier 108 is mounted rotatably on the clutch hub 104 by means of a bearing device 109. Radially outside, on the external disc carrier 108, a ring gear 110 is fixed, for example, around which a motorcycle chain engages.

The clutch hub 104 together with the clutch unit 81 and the actuation device 82 can be stuck on one end of a shaft (not shown), in particular of a drive shaft of an internal combustion engine of the motorcycle. The clutch hub 104 is equipped with internal gear teeth that connect the clutch hub 104 non-rotatably with the shaft. With the help of a screw element (not shown), the clutch hub 104 together with the clutch unit 81 and the actuation device 82 can be fixed on the corresponding shaft end.

The cable-pull socket 90 is disposed rotatably relative to housing body 120. The housing body 120 includes a circumferential guide section 121 on which the cable-pull socket 90 is disposed rotatably. The housing body 120 furthermore includes an axial guide section 122 that, for example, is equipped with longitudinal grooves or flutes. In the partition area between the circumferential guide section 121 and the axial guide section 122, a collar 125 is disposed, which extends radially outwards from the cable-pull socket 90. The collar 125 of the cable-pull socket 90 is supported axially under an interposed axial bearing device 128 and two support rings 129, 130 on the clutch cover 83. Through the axial support of the collar 125, on the clutch cover 83, the complete actuation device 82 is held or fixed on the clutch cover 83.

Through a bearing bush 132 that is disposed between the cable-pull socket 90 in the radial direction and an inwardly angled collar of clutch cover 83, the cable-pull socket 90, together with the housing body 120, is rotatably mounted on the clutch cover 83.

Ramps 135 are provided on the collar 125 of the cable-pull socket 90 that interact with actuation ramps 136 that are formed on an actuation body 138. A ball-holding body 140 with balls 141, 142 is disposed axially between the ramps 135 and the actuation ramps 136. The ball-holding body 140 satisfies the function of a cage, as used in roller bearings. The balls 141, 142 can be considered analogously to the rollers in a bearing. The actuation ramps 136 are provided on an actuation collar 144 of the actuation body 138.

The actuation body 138 furthermore includes an axial guide section 145 that is executed complementarily to the axial guide section 122 of the housing body 120, such that the actuation body 138 with the axial guide section 145 on the axial guide section 122 of the housing body 120 can move axially to-and-fro. According to an essential aspect of the invention, the actuation collar 144 of the actuation body 138 interacts with a diaphragm spring 148.

The diaphragm spring 148 includes a diaphragm-spring annular body, from which diaphragm spring tongues 149 extend radially inwardly. The free ends of the diaphragm spring tongues 149 lie on an adapter-ring body 150 that interacts with a shoulder 151 with the actuation collar 144 of the actuation body 138. An axial bearing device 152 with an axial spring 153 and a support ring 154 is disposed between the shoulder 151 of the adapter-ring body 150 and the actuation collar 144 of the actuation body 138. The axial spring device 153 serves to hold the adapter-ring body 150 with an adapter-ring collar 155 in contact with the diaphragm spring tongues 149.

When the actuation device 82 is actuated via the cable-pull, the cable-pull socket 90 rotates about its longitudinal axis. The rotary motion of the cable-pull socket 90 is converted via the ramps 135, 136 into an axial movement of the actuation body 138. The axial movement of the actuation body 138 is transmitted via the adapter-ring body 150 to the diaphragm spring.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A clutch unit comprising: a clutch cover: a clutch hub that is mounted non-rotatably on a shaft and includes at least two clutch elements that can be brought into frictional engagement with one another for torque transmission when the clutch unit is actuated; a mechanical actuation device is attached to and supported axially on the clutch cover of the clutch unit; a cable-pull device connected with the mechanical actuation device for disengaging the clutch elements, wherein the mechanical actuation device includes an annular housing body having a housing body collar; and wherein the housing body is supported axially on the clutch cover and the housing body collar is mounted rotatably relative to the clutch cover by a bearing.

2. A clutch unit according to claim 1, wherein the actuation device together with the clutch unit is mounted on the shaft.

3. A clutch unit according to claim 1, wherein the actuation device is clamped axially between the clutch cover and a diaphragm spring.

4. A clutch unit according to claim 3, wherein the diaphragm spring is installed under initial stress such that the clutch elements are held in frictional engagement so long as the actuation device is not actuated by the cable-pull.

5. A clutch unit according to claim 1, wherein a cable-pull holding device is attached to the housing body and includes a cable sheath socket.

6. A clutch unit according to claim 5, wherein the housing body includes housing ramps and an annular space accommodating an actuation body and the housing ramps that interact with actuation ramps that are carried by the actuation body.

7. A crutch unit according to claim 6, wherein the cable-pull is hung in a cable-pull adapter that is hinged on the actuation body.

8. A clutch unit according to claim 6, wherein balls are disposed between the actuation ramps of the actuation body and the housing ramps of the housing body.

9. A clutch unit according to claim 8, wherein the balls are held rotatably inside a ball-holding body such that the balls lie both on the actuation ramps of the actuation body and on the housing ramps of the housing body.

10. A clutch unit according to claim 6, wherein the actuation body is mounted rotatably inside the housing body with a bearing body, and the bearing body includes a bearing race that is disposed in the radial direction between the housing body and the actuation body.

11. A clutch unit according to claim 10, wherein the bearing body includes a bearing collar interacting axially with an adapter-ring body.

12. A clutch unit according to claim 11, wherein an axial bearing device is disposed axially between a shoulder of the adapter-ring body and the bearing collar of the bearing body.

13. A clutch unit according to claim 11, wherein the adapter-ring body includes an adapter collar against which diaphragm spring tongues of a diaphragm spring lie.

14. A clutch unit according to claim 1, wherein the actuation device includes a housing body with an axial guide section on which an actuation body is guided such that it is movable axially to-and-fro.

15. A clutch unit according to claim 14, wherein the cable-pull device includes a cable sheath socket for a cable sheath through which a cable-pull extends is attached to the housing body.

16. A clutch unit according to claim 15, wherein the housing body includes a circumferential guide section on which a cable-pull socket for the cable-pull is disposed, and includes a cable-pull coiling section having a cable-pull receptacle groove.

17. A clutch unit according to claim 16, wherein the cable-pull coiling section defines a surface on which a piece of cable can be coiled, and the cable-pull coiling section includes the cable-pull receptacle groove.

18. A clutch unit according to claim 16, wherein the cable-pull socket includes a collar that is supported axially on the clutch cover.

19. A clutch unit according to claim 18, wherein an axial bearing device is disposed axially between the cabel-pull socket collar and the clutch cover.

20. A clutch unit according to claim 18, wherein a bearing bush is disposed radially between the cable-pull socket and the clutch cover.

21. A clutch unit according to claim 18, wherein the cable-pull socket collar includes ramps that axially face actuation ramps carried by the actuation body.

22. A clutch unit according to claim 21, wherein balls are disposed between the actuation ramps of the actuation body and the ramps of the cable-pull socket collar.

23. A clutch unit according to claim 22, wherein the balls are held rotatably inside a ball-holding body such that they contact both the actuation ramps of the actuation body and the ramps of the cable-pull socket collar.

24. A clutch unit according to claim 21, wherein the actuation body includes an actuation collar on which the actuation ramps are provided, and the actuation body interacts with a diaphragm spring.

25. A clutch unit according to claim 24, wherein the housing body includes an axial guide section with which the actuation body is guided such that the actuation body is movable axially to-and-fro on the housing body.

26. A clutch unit according to claim 24, wherein an adapter-ring body is disposed axially between the diaphragm spring and the actuation collar.

27. A clutch unit according to claim 26, wherein an axial bearing is disposed axially between the actuation collar of the actuation body and a shoulder of the adapter-ring body.

28. A clutch unit according to claim 27, wherein an axially acting spring is disposed axially between the shoulder of the adapter-ring body and the axial bearing.

29. A clutch unit according to claim 26, wherein the adapter-ring body includes an adapter-ring collar on which diaphragm spring tongues of the diaphragm spring lie.

30. A clutch unit according to claim 1, wherein the actuation device is actuated via the cable-pull by a hand-activated lever.

* * * * *